UNITED STATES PATENT OFFICE.

ARNALDO CAROSELLI, OF FLÖRSHEIM-ON-THE-MAIN, GERMANY, ASSIGNOR TO THE FIRM OF CHEMISCHE FABRIK FLÖRSHEIM DR. H. NOERDLINGER, OF FLÖRSHEIM-ON-THE-MAIN, GERMANY.

PROCESS OF MANUFACTURING CAOUTCHOUC-LIKE PRODUCTS.

1,031,837.  Specification of Letters Patent.  Patented July 9, 1912.

No Drawing.  Application filed August 2, 1911.  Serial No. 641,941.

*To all whom it may concern:*

Be it known that I, ARNALDO CAROSELLI, doctor of philosophy, a subject of the German Emperor, and residing at Flörsheim-on-the-Main, Germany, have invented a certain new and useful Improved Process of Manufacturing Caoutchouc-Like Products, of which the following is a specification.

The subject-matter of my invention is a process of manufacturing caoutchouc-like products.

It is well known that fatty oils, particularly rape-oil and castor-oil, after having been oxidized with air or oxygen are converted with the aid of sulfur or chlorid of sulfur into products similar to caoutchouc which are extensively employed as caoutchouc substitutes. Also, more or less solid products have been obtained from castor-oil by treatment with chlorid of zinc or chlorid of aluminum. Now I have found that oxidized fatty oils can be very readily condensed with formaldehyde to products having similar properties. By oxidized oils are to be understood such oils as have absorbed oxygen when air or oxygen is blown into them or when they are exposed for a long time to the air, (*cf. e. g.* Hefter, "*Technologie der Fette und Oele,*" Berlin, 1910, vol. 3., page 371, paragraph 1), the following, among others, coming into question:—oxidized rape-oil, castor-oil, sesame-oil, poppy-oil, linseed-oil, olive-oil and fish-oil.

My process may be carried into practice as follows: 300 kilos. castor-oil which have been treated about 30 hours at 140° to 180° C. with a current of air are mixed with 100 kilos. 40% formaldehyde and 100 kilos. 50% sulfuric acid and heated to about 80° to 90° C. The reaction at once takes place with foaming, and the product congeals to a caoutchouc-like mass. This is cut into pieces after cooling and liberated from sulfuric acid and excess formaldehyde by washing with water. Instead of sulfuric acid, other condensation agents, such as hydrochloric acid, salt solutions, etc., can be employed. These new products materially differ from the condensation products obtained with formaldehyde from non-oxidized oils in that the latter products are oily and liquid, whereas the former are elastic, scarcely adhesive, solid bodies. The new bodies can be saponified with alkalis. By adding acids, for instance hydrochloric or sulfuric acid, to the soap solutions obtained after the saponification, such fatty acids are separated which in their physical properties are viscous, elastic, and slightly adhesive, but not oily or in the form of a thin liquid. In contradistinction thereto, the condensation products obtained from non-oxidized oils with formaldehyde yield fatty acids of another kind when saponified and treated with hydrochloric or sulfuric acid, such fatty acids being in the form of a thin liquid and oily bodies.

A modification of the process consists in treating mixtures of the above characterized oxidized oils with phenols in the presence of a condensation agent with formaldehyde or a substance which produces formaldehyde. The new condensation products made from oxidized oils differ in their gum-like character from the well-known rosin-like condensation products obtained with formaldehyde from phenols. How this modification of my process may be carried into practice will now be explained with reference to some examples:—4 kilos. naphthol are dissolved in 50 kilos. of oxidized castor-oil, whereupon a mixture 20 kilos. 30% formaldehyde and 2½ kilos. hydrochloric acid is added to this solution. When heated to 90° to 100° C. an exceedingly elastic solid body is formed. Instead of or in addition to the phenols other substances which give reactions with aldehydes, such as vegetable and animal albumins or bodies containing albumin, *e. g.* casein, milk, blood and the like, may be added to the reaction mixure. In this case I proceed, for example, as follows:

(I). 100 parts of castor-oil, treated for 12 hours at about 150° to 200° C., are mixed, at a gentle heat, with 15 parts 30% formaldehyde, 5 parts concentrated hydrochloric acid and 30 parts casein, and heated slowly to about 95° C. At this temperature a tough, elastic body is formed which is washed with water and dried.

(II). 100 parts castor-oil oxidized as under I, 15 parts 30% formaldehyde, 5 parts concentrated hydrochloric acid, 5 parts gelatin dissolved in 15 parts water are treated in the same manner as stated under I.

Instead of castor-oil oxidized linseed-oil can be taken which is then treated further with the same quantities of formaldehyde, hydrochloric acid, casein or gelatin. Instead of formaldehyde other aldehydes and substances such as carbo-hydrates, starch-flour, sucrose, glucose, levulose and others can be employed. The reaction takes place somewhat slower, it is true, but likewise yields very elastic products. The process is then, for example, as follows:—

Example I: 100 parts oxidized castor-oil, 40 parts wheat-starch, 50 parts sulfuric acid of sp. gr. 1.31 are intimately mixed together and heated, with agitation, on the water-bath until an elastic mass is produced. The product thus obtained is liberated from excess sulfuric acid by kneading with water.

Example II: 100 parts oxidized castor-oil, 20 parts sucrose, 20 parts sulfuric acid of sp. gr. 1.185 are treated in the same manner as stated in Example I.

Example III: 100 parts oxidized linseed-oil, 40 parts wheat-starch, 50 parts sulfuric acid of sp. gr. 1.31 are treated as stated under Example I. A solid, elastic, non-adhesive product is produced.

Example IV: 100 parts oxidized linseed-oil, 20 parts sucrose, 20 parts sulfuric acid of sp. gr. 1.185 are treated in the same manner as above.

As the products obtained according to the present invention are to be used, among other purposes, in the manufacture of linoleum, artificial leather, packing and insulating materials, in order at once to produce such products the reaction mass may have added to it indifferent substances and loading materials which do not themselves need to enter into reaction with the reaction substances, as e. g. powdered cork, powdered wood, cellulose, clay, earthy pigments, kieselguhr and other loading materials of any desired kind according in each instance to the special properties which the finished products are to acquire.

I claim:

1. The hereindescribed process of manufacturing caoutchouc-like products, which consists in treating oxidized oils in the presence of a condensation agent with an aldehyde.

2. The hereindescribed process of manufacturing caoutchouc-like products which consists in treating oxidized oils in the presence of a condensation agent with formaldehyde.

3. The hereindescribed process of manufacturing caoutchouc-like products which consists in treating oxidized oils in the presence of a condensation agent with a substance which produces formaldehyde.

4. The hereindescribed process of manufacturing caoutchouc-like products, which consists in treating mixtures of oxidized oils and albumens in the presence of a condensation agent with an aldehyde.

5. The hereindescribed process of manufacturing caoutchouc-like products, which consists in treating a mixture of oxidized oils and loading materials in the presence of a condensation agent with an aldehyde.

In testimony whereof, I affix my signature in the presence of two witnesses.

ARNALDO CAROSELLI.

Witnesses:
 JEAN GRUND,
 CARL GRUND.